United States Patent
Herkenhoff et al.

(10) Patent No.: US 7,230,879 B2
(45) Date of Patent: Jun. 12, 2007

(54) METHOD AND APPARATUS FOR TRUE RELATIVE AMPLITUDE CORRECTION OF SEISMIC DATA FOR NORMAL MOVEOUT STRETCH EFFECTS

(75) Inventors: E. Frederic Herkenhoff, Orinda, CA (US); Richard B. Alford, Concord, CA (US); Harry L. Martin, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 239 days.

(21) Appl. No.: 11/056,640

(22) Filed: Feb. 12, 2005

(65) Prior Publication Data

US 2006/0193205 A1    Aug. 31, 2006

(51) Int. Cl.
    *G01V 1/28*    (2006.01)
(52) U.S. Cl. .............................. 367/47; 367/52; 702/17
(58) Field of Classification Search ................. 367/47, 367/52; 702/14, 17
    See application file for complete search history.

(56) References Cited

U.S. PATENT DOCUMENTS

| | | | |
|---|---|---|---|
| 3,613,071 A | 10/1971 | Quay et al. | |
| 3,705,382 A | 12/1972 | Quay | |
| 3,735,337 A | 5/1973 | Widess | |
| 4,503,527 A | 3/1985 | Pann | |
| 4,747,054 A * | 5/1988 | Chittineni | 702/14 |
| 4,759,836 A | 7/1988 | Ahem et al. | |
| 4,894,809 A | 1/1990 | Moeckel | |
| 4,964,103 A | 10/1990 | Johnson | |
| 4,995,007 A | 2/1991 | Corcoran et al. | |
| 5,083,297 A | 1/1992 | Ostrander | |
| 5,150,331 A | 9/1992 | Harris et al. | |
| 5,197,039 A | 3/1993 | Corcoran et al. | |

(Continued)

FOREIGN PATENT DOCUMENTS

EP    0 335 450 B1    9/1993

(Continued)

OTHER PUBLICATIONS

Swan, Herbert W., Removal of offset-dependent tuning in AVO analysis, ARCO Exploration and Production Technology, A division of Atlantic Richfield Company, AVO 2.5, pp. 175-178.

*Primary Examiner*—Ian J. Lobo
(74) *Attorney, Agent, or Firm*—Maurice E. Teixeira

(57) ABSTRACT

The present invention provides a method and apparatus for arriving at true relative amplitude destretched seismic traces from stretched seismic traces. The method compensates for offset varying reflection interference effects due to normal moveout. Stretch factors $\beta$ and also input spectra are determined for NMOR stretched seismic traces. Estimates are then made of stretched wavelet spectra from the input spectra. A destretched wavelet spectra is then obtained. Shaping correction factors are determined by taking the ratio of the destretched wavelet spectra to the stretched wavelet spectra and are applied to the input spectra of the stretched traces to arrive at a destretched trace spectra. True relative amplitude scaling factors are computed by taking the ratio of a true relative amplitude property of the destretched wavelet spectra to a corresponding true relative amplitude property of the stretched wavelet spectra. Finally, the true relative amplitude scaling factors are applied to the destretched trace spectra to arrive at true relative amplitude destretched seismic traces.

12 Claims, 11 Drawing Sheets

U.S. PATENT DOCUMENTS

| | | |
|---|---|---|
| 5,500,832 A | 3/1996 | Berryhill |
| 5,596,546 A | 1/1997 | Wisecup |
| 5,661,697 A | 8/1997 | Swan et al. |
| 5,684,754 A | 11/1997 | Byun et al. |
| 5,784,334 A | 7/1998 | Sena et al. |
| 5,862,100 A | 1/1999 | VerWest |
| 6,021,379 A | 2/2000 | Duren et al. |
| 6,446,009 B1 | 9/2002 | Baeten et al. |
| 6,516,275 B2 | 2/2003 | Lazaratos |
| 6,535,818 B1 | 3/2003 | Baeten |
| 6,798,714 B1 | 9/2004 | Trickett |

FOREIGN PATENT DOCUMENTS

| | | |
|---|---|---|
| EP | 0 548 384 B1 | 3/1995 |
| EP | 0 833 171 B1 | 11/2001 |
| GB | 1 306 588 | 2/1973 |
| GB | 2 332 521 A | 8/1999 |

* cited by examiner

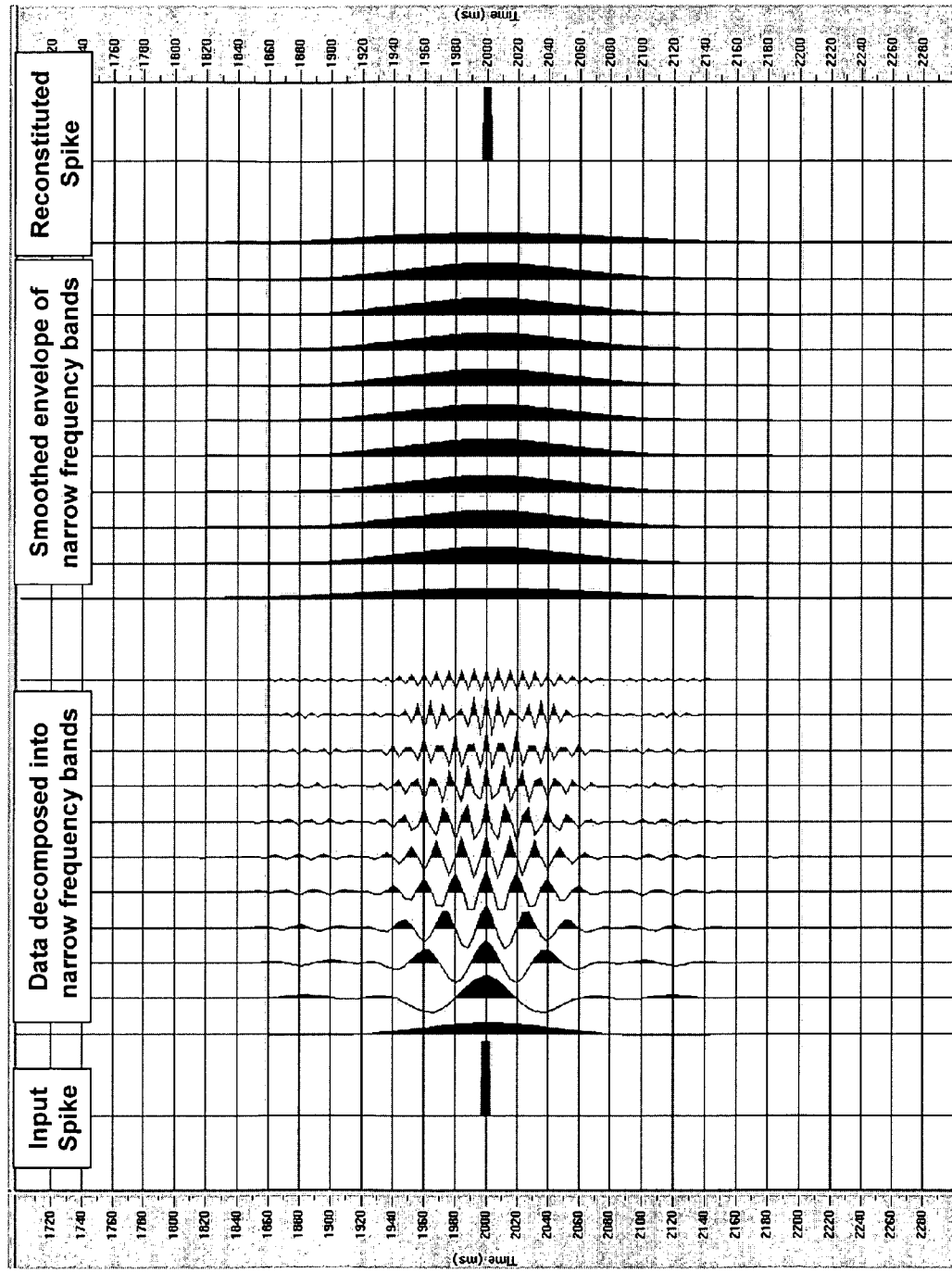

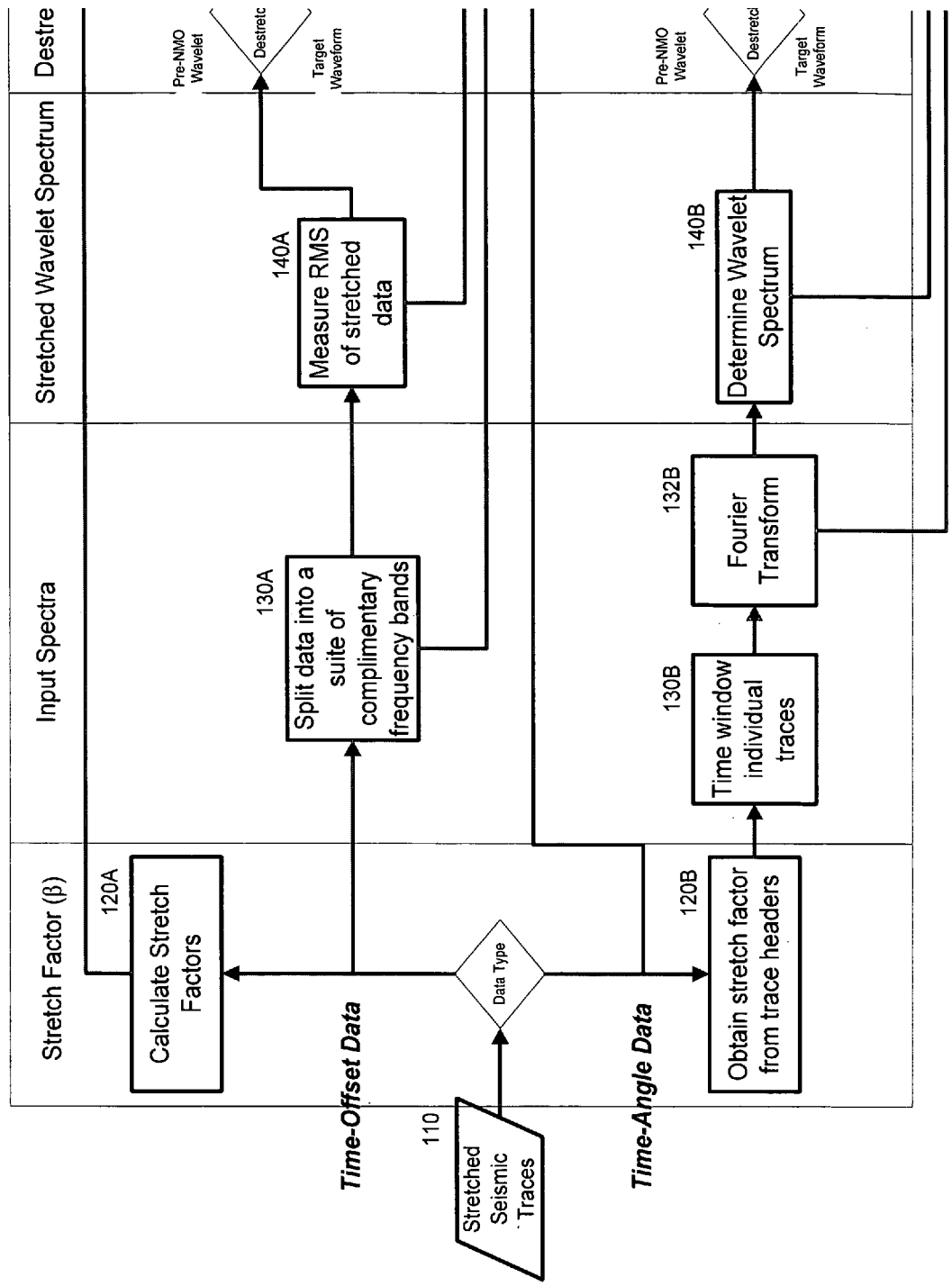
FIG. 7 (1 of 3)

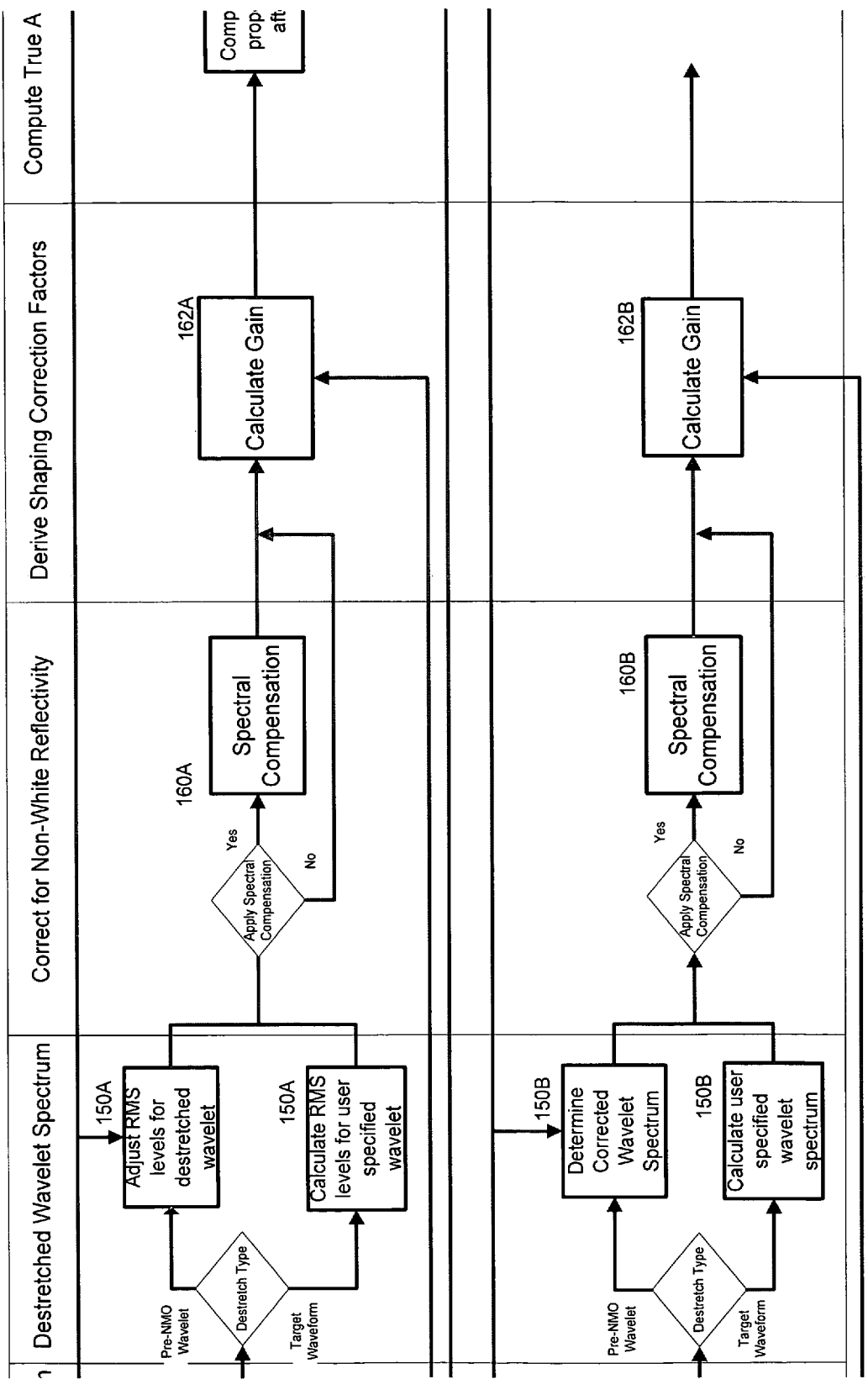
FIG 7. (2 of 3)

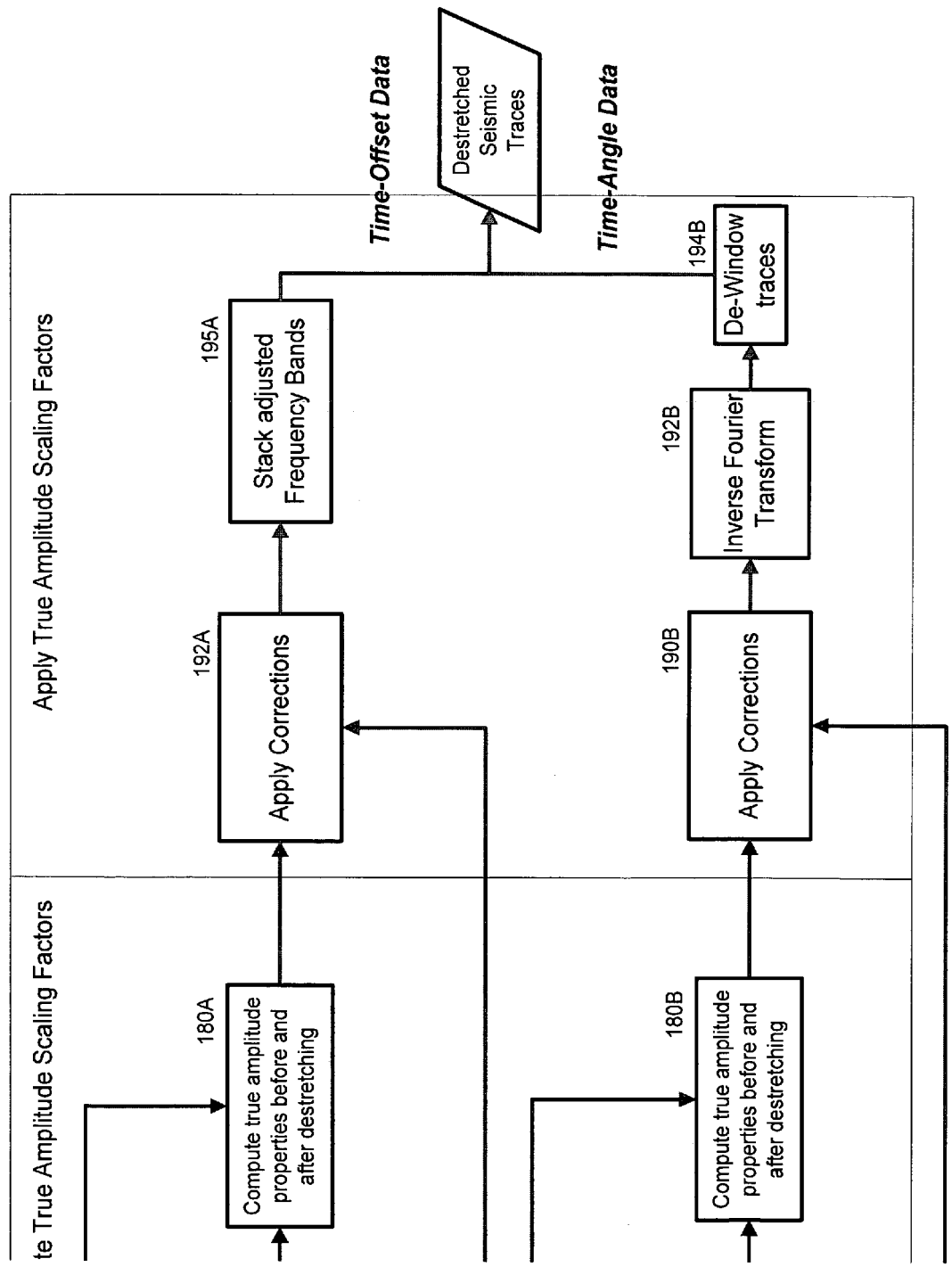
FIG. 7 (3 of 3)

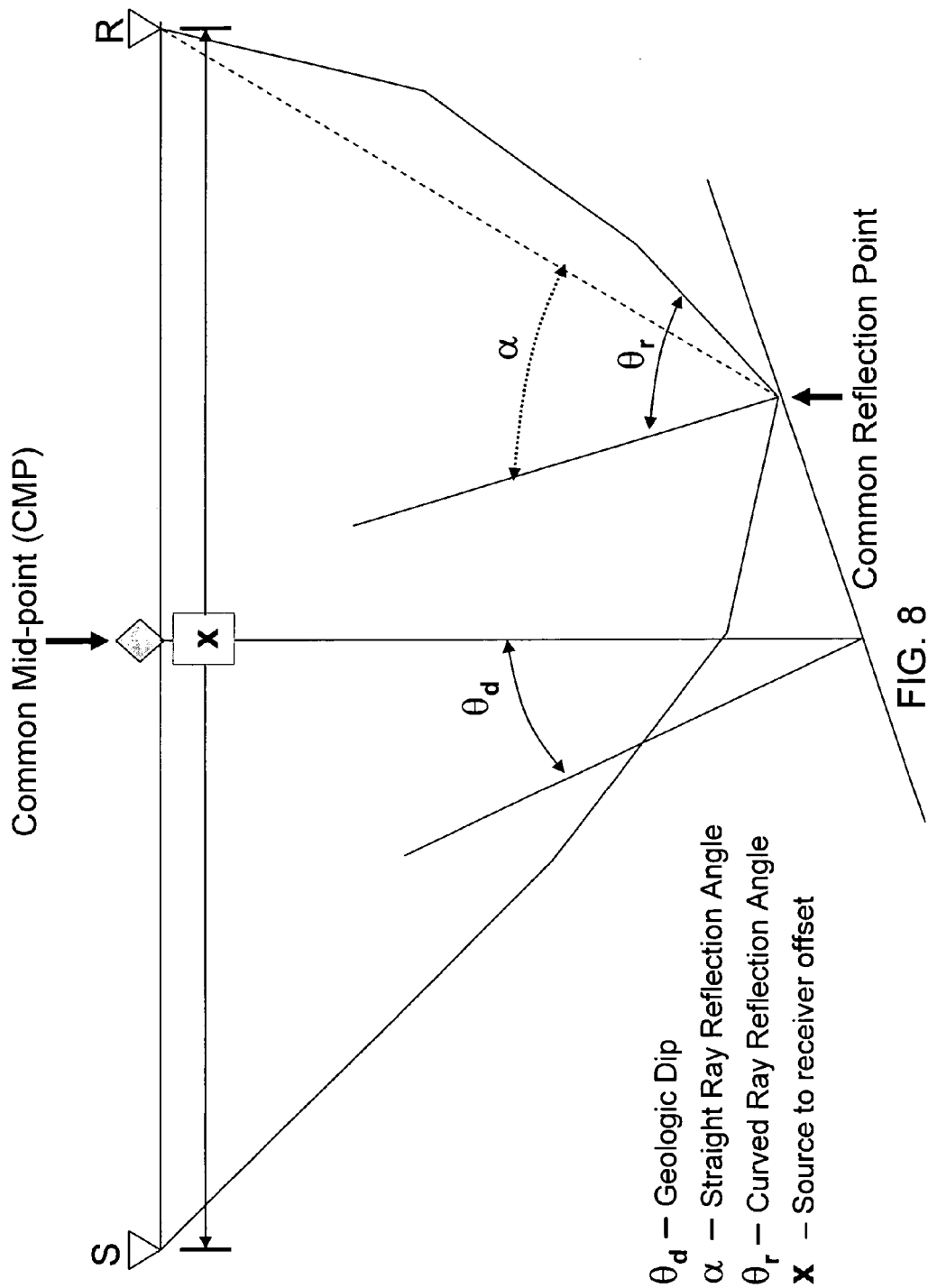

METHOD AND APPARATUS FOR TRUE RELATIVE AMPLITUDE CORRECTION OF SEISMIC DATA FOR NORMAL MOVEOUT STRETCH EFFECTS

TECHNICAL FIELD

The present invention relates generally to methods of analyzing seismic reflection data for subsurface properties, and more particularly, to a method to compensate for offset varying reflection interference effects due to normal moveout removal (NMOR) that are present in common midpoint (CMP) or common reflection point traces (CRP) seismic gathers of traces.

BACKGROUND OF THE INVENTION

Seismic data obtained in field surveys are typically recorded using a common midpoint (CMP) field technique as shown in FIG. 1. Acoustic energy in the form of a wave train is introduced into the earth from a series of "shot" sources S which are spaced apart from a common midpoint (CMP). Energy from each of the sources S strikes a common subsurface reflection point (CRP) and a portion of that energy is returned to a series of spaced apart receivers R. Using this acquisition technique, gathers of traces are recorded which are characterized by increasing shot to receiver offset distance and a common known surface (CMP) or common subsurface reflection point (CRP). These gathers of traces contain recordings of desirable signals that have been reflected from the common reflection point (CRP) of the subsurface at various reflection angles $\theta_r$, and/or refracted from subsurface formations. Further, the recorded traces also include other unwanted components, i.e. noise, in addition to the desired signals.

A reflection coefficient is a measure of the ratio of reflected wave to incident wave amplitudes, indicating how much energy is reflected from a subsurface interface. Reflection coefficients are a function of a subsurface formation's elastic properties, including changes at interfaces in compressional wave velocity, shear velocity and density. In reflection seismic art, the earth's reflection coefficients are recovered below a common known surface location from the recorded seismic amplitude response or seismic traces. The actual seismic disturbance from a single reflecting interface is characterized by a time varying response or wavelet that is related to the earth's overburden properties as well as to the reflection seismic acquisition equipment.

A wavelet is a one-dimensional pulse characterized by amplitude, frequency, and phase. The wavelet originates as a packet of energy from a source S, having a specific origin in time, and is returned to receivers R as a series of events or reflected wavelets distributed in time and energy. This distribution is dependent upon velocity and density in the subsurface and the relative position of the sources S and receivers R.

The field recorded traces of a CMP gather are typically subjected to a number of steps in a processing sequence to separate the desired signals from noise, to reduce the effect of time and offset varying wavelets and to align and compare amplitude responses from common interfaces. An important step in trace alignment is to apply normal moveout removal NMOR to the data either directly in an NMOR application or indirectly through a prestack imaging step. Travel times to common subsurface interfaces for differing shot to group offsets are calculated using the CMP gather acquisition geometry and estimates of the subsurface propagation velocity of seismic energy traveling from the shot location to a common subsurface reflection point (CRP) and then back to a receiver location. The differences in travel time between zero and non-zero shot to receiver offsets are used to map the amplitudes of traces from field record time coordinates to zero offset time coordinates. After application of NMOR whether directly applied to CMP gather traces or indirectly applied within a prestack migration to generate CRP gather traces, amplitudes of signal traces in the gather can then be (1) summed together to form stacked traces; (2) compared to one another within an amplitude versus offset (AVO) analysis; or (3) inverted for amplitude attributes from which detailed interface properties are to be deduced from changes in amplitude response.

FIGS. 2A-C illustrate the effect of wavelets and normal moveout removal (NMOR) on a single time-offset CMP gather made up of identical, equal amplitude reflections from a layered earth model composed of randomly spaced subsurface interfaces. FIG. 2A shows a CMP gather of interface reflection coefficients (RC series) illustrating the moveout effect (time convergence) of reflections from different interfaces. FIG. 2B depicts the same CMP gather with each reflection coefficient replaced by a wavelet whose amplitude is proportional to the reflection coefficient. Offset varying interference effects are shown in the form of offset varying amplitudes for a common event. FIG. 2C presents the data of FIG. 2B after application of NMOR demonstrating that moveout has generated offset varying wavelets which result in offset varying amplitudes for the equal reflection coefficients. Note in FIG. 2C that there are changes in reflection amplitude and bandwidth which are due to pre-NMOR wavelet interference as well as to NMOR correction. As a result, amplitudes in traces from different offsets differ from one another even when the underlying reflection coefficients are equal. Therefore, these NMOR corrected amplitudes are not considered to be of "true relative amplitude".

Especially because of ongoing deep water exploration and development efforts, AVO analysis and inversion are now being applied to CRP trace gathers containing processed seismic amplitudes that have been reflected from subsurface interfaces at reflection angles from 0° to 60° or more. As shown by FIG. 3 depicting the amplitude spectrum of a single event reflected from an interface at angle $\theta_r$, application of NMOR will map the amplitude spectrum and phase spectrum of a seismic wavelet to frequencies equal to $\cos\theta_r$ times the original pre-NMOR frequency while also amplifying the amplitude spectrum of the data by a factor of $(\cos\theta_r)^{-1}$ relative to the zero angle reflected event. Accordingly, for a 60° reflected event, NMOR will shift an 40 Hz amplitude response to 20 Hz while doubling the strength of the amplitude spectrum. Wavelets have both an amplitude spectrum and a phase spectrum. For the purposes of this specification, here after the term "spectra" refers to both of the amplitude spectrum and phase spectrum of a wavelet.

When multiple reflection events are present, NMOR stretches the interfering event response differently at each offset resulting in a more complex offset dependent interference as shown in FIG. 2C. Such NMOR stretch effects make it difficult to directly compare common event amplitude strengths from different offset traces to one another. Another complexity is that even after extensive processing, traces in a CMP gather will typically have embedded wavelets which vary with both time and offset. These wavelet variations are due to remaining acquisition and propagation effects and to NMOR stretch effects. Velocity analysis, which is required to align events between near and far offsets, also becomes problematic when amplitude responses for a common event vary significantly from near to far offsets. Moreover, at high frequencies NMOR stretch will reduce the signal-to-noise ratio improvements normally expected as a result of stacking seismic traces together.

U.S. Pat. No. 5,684,754 to Byun et. al teaches a method for removal of NMOR stretch from CMP gather traces. This method relies on prior knowledge of an embedded wavelet and the measurement of a NMOR stretch factor from a semblance analysis of seismic data. This technique does not provide a true relative amplitude compensation of NMOR induced amplitude effects and is thus is less than desirable for AVO analysis.

Swan, H. W., 1997, "Removal of Offset-Dependent Tuning in AVO Analysis", Expanded Abstracts of 67th Annual, Int. SEG Mtg., pp. 175-178, teaches a method for reduction of NMOR stretch effects from AVO attributes (eg. AVO intercepts and gradients) that are computed from NMOR processed traces that are not compensated for NMOR stretch effects. As a result, this method has the shortcoming of not being applicable for the correction of CMP or CRP gather traces.

U.S. Pat. No. 6,516,275 to Lazaratos describes removing wavelet stretch effects from seismic traces prior to operations such as stacking or computing AVO attributes. A method for destretching individual traces is taught in which time and offset varying filters are used to match the response of stretched, nonzero offset traces to that of a zero offset (and destretched) trace. Because this method involves making each nonzero offset trace match a zero offset trace by designing and applying an equalization filter, the method can alter relative amplitude relationships between traces when reflectivity strength varies. This method fails to restore trace amplitudes to the relative values consistent with each traces' reflectivity being convolved with a pre-NMOR wavelet. To be true amplitude this method must assume that all pre-NMOR traces have the same wavelets as the zero offset pre-NMOR trace. Moreover, this method also implicitly assumes that the reflectivity of each trace averaged in time has the same value at all offsets as it does on the zero offset trace—an assumption that is generally not met across a wide range of offsets or reflection angles.

Accordingly, there is a need for a method and apparatus which overcome shortcomings of previous methods and apparatus which fail to destretch seismic traces so as to recover true relative amplitudes of seismic reflections between traces of differing offsets. More particularly, these methods fail to compensate for offset varying reflection interference effects due to normal moveout. The present invention provides a solution to these shortcomings.

SUMMARY OF THE INVENTION

Seismic traces may be stretched due to direct normal moveout removal (NMOR) processing or stretched indirectly through a prestack imaging processing step. The present invention provides a method for arriving at true relative amplitude destretched seismic traces from such stretched seismic traces. In particular, the method compensates for offset varying reflection interference effects due to normal moveout.

In a preferred embodiment of this method, stretch factors β and also input spectra are determined for NMOR stretched seismic traces. Estimates are then made of stretched wavelet spectra from the input spectra. A destretched wavelet spectra is then obtained which may be either the same wavelet that was embedded in the seismic data traces prior to NMOR or else by using an externally specified target wavelet. Shaping correction factors are then determined by taking the ratio of the destretched wavelet spectra to the stretched wavelet spectra. The shaping correction factors are applied to the input spectra of the stretched traces to arrive at destretched trace spectra.

True relative amplitude scaling factors are then computed by taking the ratio of a true relative amplitude property of the destretched wavelet spectra to a corresponding true relative amplitude property of the stretched wavelet spectra. Examples of true relative amplitude properties, by way of example and not limitation, might include the zero time value of a wavelet, the area under the amplitude spectrum of the wavelet, or the time average mean absolute value of the stretched traces. Finally, the true relative amplitude scaling factors are applied to the destretched trace spectra to arrive at true relative amplitude destretched seismic traces whereby the true relative amplitude property of the stretched wavelet spectra is substantially preserved.

The destretched wavelet spectra may be obtained by mapping the stretched wavelet spectra into the destretched wavelet spectra utilizing the similarity theorem and the stretch factor β. Further, the target wavelet spectra can be modified to correct for non-white reflectivity. The stretch factors β are preferably calculated deterministically as functions of variables such as offset, time, rms velocity, interval velocity, overburden anisotropy and geologic dip. Examples of gathers of traces for which stretch factors may be calculated include CDP, DMO or CRP gathers.

An objective of the present invention is to correct the changes in reflection amplitude and bandwidth induced due to NMOR processing of traces so that amplitudes from traces of different offsets are substantially proportional to the underlying reflection coefficient and identical to one another (true relative amplitude) when the underlying reflection coefficients are equal.

BRIEF DESCRIPTION OF THE DRAWINGS

These and other objects, features and advantages of the present invention will become better understood with regard to the following description, pending claims and accompanying drawings where:

FIGS. 4A-D illustrate time domain responses of decomposing a single event into frequency bands wherein FIG. 4A is an input spike, FIG. 4B shows the data decomposed into narrow frequency bands, FIG. 4C depicts smoothed envelopes of narrow frequency bands and FIG. 4D shows a reconstituted spike;

FIG. 7 is a flowchart more specifically showing the steps of FIG. 6 used with time-offset trace data (top half of the flowchart) and time-angle trace data (lower half of the flowchart);

FIG. 8 is a schematic drawing showing geometry and terms used in calculating stretch factors β.

DETAILED DESCRIPTION OF THE INVENTION

I. Convolutional Model Applied to Normal Moveout Stretch

An accepted model for processed seismic data amplitudes provides that the amplitudes represent the convolution of a source excitation wavelet with subsurface reflection coefficients derived from the changes in elastic properties at subsurface interfaces. The time domain form of this model provides that processed seismic data traces, prior to NMOR, can be represented as the convolution of a wavelet with an earth reflection coefficient function or:

$$d(t,t_{0j},\Delta t_j) = \int w(\tau) r(t-t_{0j}-\Delta t_j-\tau) d\tau \quad (1)$$

where $d(t,t_{0j},\Delta t_j)$ is a seismic data trace, $w(\tau)$ is the wavelet and $r(t-t_{0j}-\Delta t_j)$ is a sum of discrete subsurface reflection coefficient delta (impulse) functions given by:

$$r(t-t_{0j}-\Delta t_j) = \Sigma r_j \delta(t-t_{0j}-\Delta t_j). \quad (2)$$

In this expression, $r_j \delta(t-t_{0j}-\Delta t_j)$ is a time domain representation of the jth reflection coefficient of magnitude $r_j$ with a zero offset time of $t_{0j}$ and a pre-NMOR time shift of $\Delta t_j$.

In the frequency domain, this convolution is expressed as a multiplication of the Fourier transforms of the wavelet and the earth reflection coefficient function or $$D(f) = W(f) \Sigma r_j e^{-2\pi i f(t_{0j}-\Delta t_j)}. \quad (3)$$

In this expression $D(f)$, $W(f)$ and $\Sigma r_j e^{-2\pi i f(t_{0j}-\Delta t_j)}$ are respectively the Fourier transforms of the pre-NMOR data, $d(t,t_{0j},\Delta t_j)$, the pre-NMOR wavelet function, $w(t)$, herein after simply referred to as just a wavelet, and the reflection coefficient function, $r(t-t_{0j}-\Delta t_j)$.

Key insights for removing the effects of NMOR on stretched traces derive from the understanding that NMOR has a different effect on the reflection coefficient function than it has on the wavelets. First, the model supporting application of applying NMOR to the reflection coefficient function is to align the times of the reflection coefficients to the zero offset time, $t_{0j}$, without altering their magnitudes $r_j$. Conceptually, NMOR changes the travel time between the reflection coefficient at the top and base of a layer to be that of the vertical travel time through the layer. Apply the shift theorem (R. M. Bracewell, The Fourier Transform and Its Applications, McGraw-Hill, 1965, p. 104-107), NMOR transforms the reflection coefficient function as follows:

$$\Sigma r_j \delta(t-t_{0j}-\Delta t_j) \Rightarrow \text{NMO} \Rightarrow \Sigma r_j \delta(t-t_{0j}) \supset \Sigma r_j e^{-2\pi i f t_{0j}} \quad (4)$$

where $r_j \delta(t-t_{0j}-\Delta t_j)$ is a time domain representation of a reflection coefficient of magnitude $r_j$ at zero offset time $t_{0j}$ before applying an NMOR time shift of $\Delta t_j$, ⊃ indicates the Fourier transform of $\Sigma r_j \delta(t-t_{0j})$ to the frequency domain.

Figure 1:
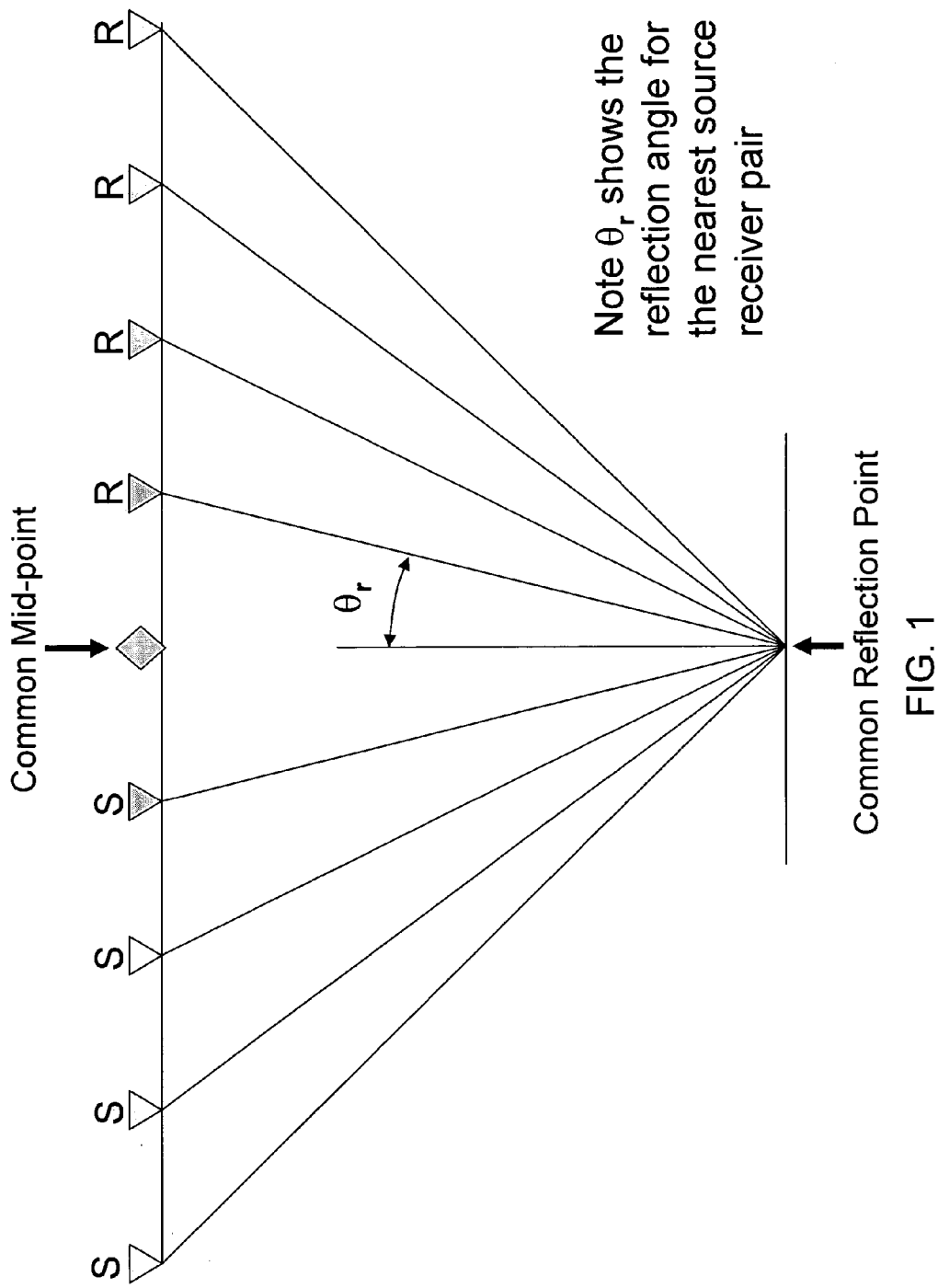
FIG. 1 is a schematic drawing showing the geometry of acquisition of a common midpoint (CMP) gather of traces wherein shot sources S produce energy which is reflected from a common reflection point (CRP) and recorded by receivers R.
Figure 2:
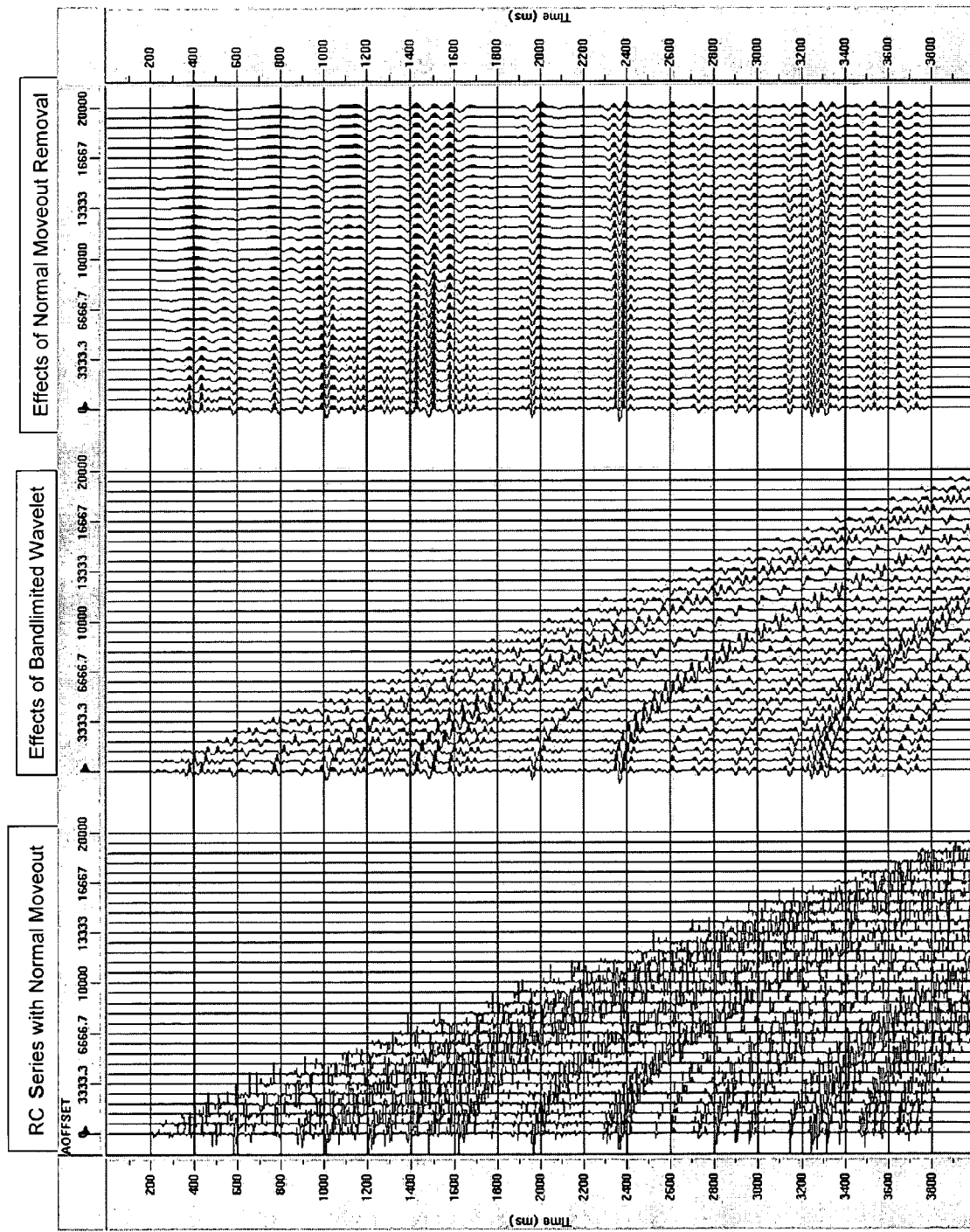
FIGS. 2A-C illustrate a CMP gather of interface reflection coefficients (RC series), the same CMP gather with each reflection coefficient replaced by a wavelet whose amplitude is proportional to a respective reflection coefficient, and the CMP gather after the removal of normal moveout (NMO)
Figure 3:
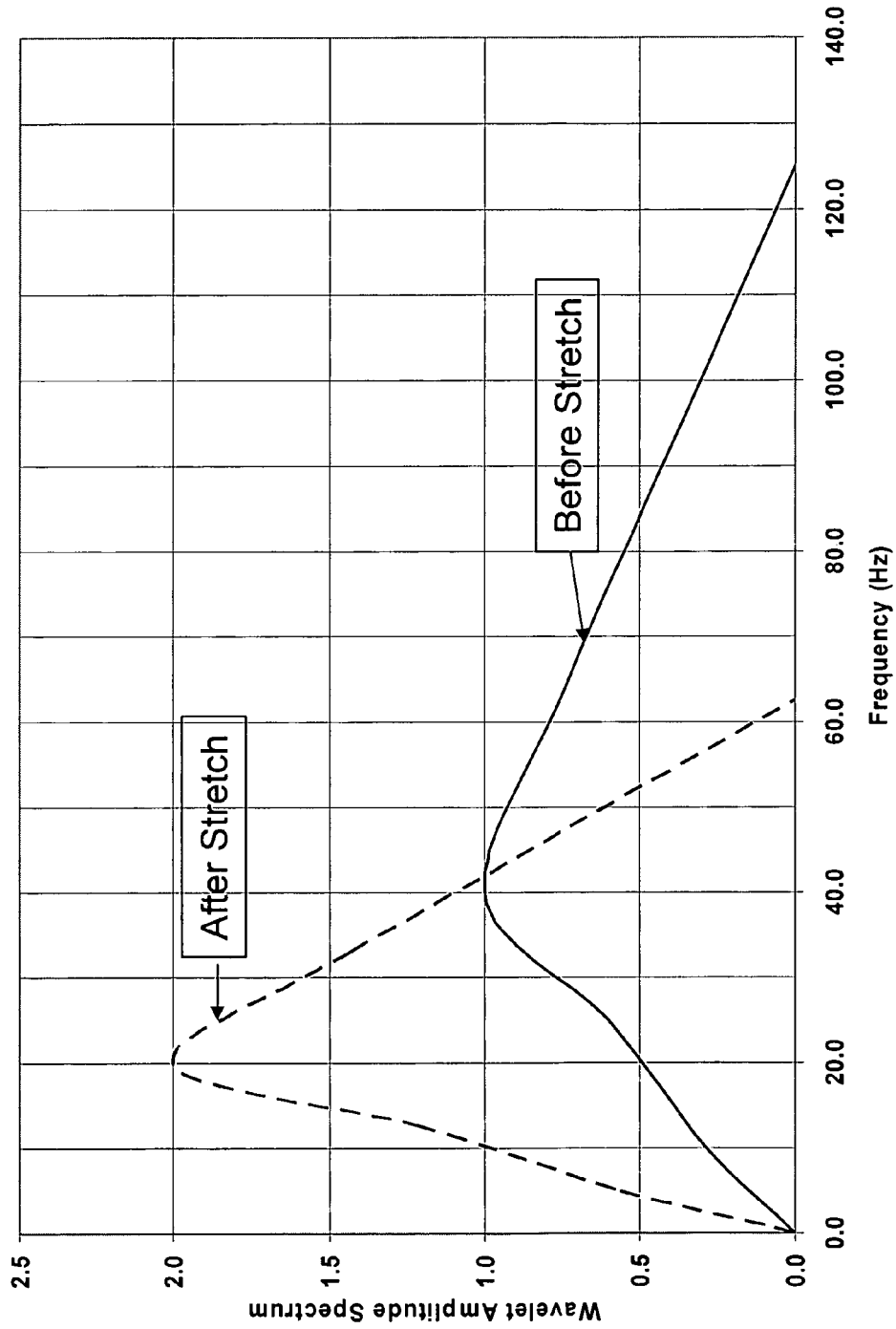
FIG. 3 is a graph illustrating the effect of stretch on a wavelet amplitude spectrum with maximum amplitude being enhanced and shifted to a lower frequency due to NMOR and the wavelet being stretched.

Second, the effect of applying NMOR in the time domain to a wavelet is to stretch it by a time varying factor β that is related to offset dependent differences in travel time to an interface. The similarity theorem (R. M. Bracewell, The Fourier Transform and Its Applications, McGraw-Hill, 1995, p. 101-104) may be used to describe the frequency domain effect of applying a constant stretch factor β to a pre-NMOR time domain wavelet w(t) and is illustrated in FIG. 3. The similarity theorem provides that:

$$w(t) \Rightarrow \text{stretch} \Rightarrow w(t/\beta) \supset W(f\beta)|\beta| \quad (5)$$

where $w(t/\beta)$ is the wavelet stretched in time, ⊃ indicates the Fourier transform of $w(t/\beta)$ to the frequency domain, $W(f\beta)|\beta|$ is the Fourier transform of the stretched wavelet and β is a stretch factor which will typically vary with time and offset in CMP or CRP traces. Conceptually, the similarity theorem governs the effects of NMOR on wavelets while the shift theorem governs the effect of NMOR on reflection coefficients. NMOR alters the time differences between reflection coefficients but not their magnitudes.

Finally, because of the differing effects of NMOR on reflectivity and wavelets, Fourier transforms of typical NMOR corrected seismic traces, $D_{nmo}(f)$, yield spectra of the form:

$$D_{nmo}(f) = W(f\beta)|\beta|(\Sigma r_j e^{-2\pi i f t_{0j}}) \quad (6)$$

indicating that the pre-NMOR wavelet's frequency components are scaled by a frequency dependent sum of earth reflection coefficients as well as being shifted and scaled by the stretch factor β.

In summary, the convolutional model predicts that application of NMOR to CMP or CRP gather traces will result in frequency dependent changes to both the amplitude and phase spectra of convolved wavelets but in no changes to the underlying reflection coefficient amplitudes. Removal of NMOR stretch requires estimating and then compensating wavelet spectra for the stretch factor β to produce output trace amplitudes that are scaled in proportion to local subsurface reflection coefficients.

II. Concepts for True Relative Amplitude Correction of Stretched Traces

The present invention provides a method and apparatus for true relative amplitude correction of seismic traces for the effects of NMOR stretch. Removal of NMOR stretch (destretching) is achieved in the frequency domain by estimating a wavelet stretch factor β and removing it from an estimate of the stretched wavelet $W(f\beta)|\beta|$ so that the resultant data (convolution of the embedded wavelet and reflection coefficient function) becomes:

$$W(f\beta)|\beta|\Sigma r_j e^{-2\pi i f t_{0j}} \Rightarrow \text{Destretch} \Rightarrow W(f)\Sigma r_j e^{-2\pi i f t_{0j}} \quad (7)$$

where the wavelet stretch factor β is equal to the inverse of the cosine of the interface reflection angle $\theta_r$ and $W(f)$ is a destretched or externally specified target wavelet.

The stretched wavelet spectra $W(f\beta)|\beta|$ can be estimated using trace spectral averaging techniques. These techniques reduce the effect of the earth's reflection coefficients on a trace's amplitude spectrum to that of a constant scalar multiplier. Spectral averaging techniques rely on earth reflection coefficients averaged within a frequency band taken from a large time gate to be statistically constant or of a known spectral shape. The averaging techniques include frequency band averaging of a trace's spectra or Fourier transforming a limited number of lags of a trace's autocorrelation function. The effect of non-white reflection coefficient spectra on estimated wavelet spectra can be removed by application of reflectivity whitening filters as described herein.

In a preferred embodiment of this invention, the effect of varying earth reflection coefficients in a trace's spectra are minimized by averaging amplitude and phase samples within frequency bands. Ideally, the number of frequency samples that are averaged is inverse to the maximum expected wavelet duration and also greater than the ratio of transform time window to wavelet time duration (should preferably include at least 10 spectral samples in each frequency band.) Averaged trace amplitude and phase spectra from such bands will be reflectivity scaled estimates of stretched wavelet spectra, $W_n(f)$, of the form:

$$W_n(f) = (r_c) W(f\beta)|\beta| \tag{8}$$

where $W(f)$ is the pre-NMOR wavelet spectra and $r_c$ is a frequency independent, time and offset dependent scale factor that depends on local subsurface reflection coefficients. As illustrated in steps 130B, 132B, and 140B of FIG. 7, alternately, wavelet spectra estimates can be generated by frequency domain averaging of the Fourier transform samples of small time gates.

"True relative amplitude" destretch is defined as an operation which preserves the zero time value of the stretched (pre-NMO) wavelet convolved with an isolated reflection coefficient. This occurs if the zero time values of the stretched wavelet $w(t/\beta)|_{t=0}$ and destretched wavelet $w(t)|_{t=0}$ are constrained so that:

$$w(t)|_{t=0} = w(t/\beta)|_{t=0} = \text{constant} \tag{9}$$

In the frequency domain, this constraint would require that:

$$\Sigma W(f_i\beta)|\beta| = \Sigma W(f_i) \tag{10}$$

where $W(f_i)$ are discrete values of a destretched wavelet's Fourier transform.

If the phase spectrum of the wavelet is assumed to be zero, or if only the amplitude spectrum of the wavelet is known, true relative amplitude destretching of the data can alternately be defined as an operation that does not alter the area under the amplitude spectrum of the wavelet so that:

$$\Sigma (W(f_i\beta)|\beta|W^*(f_i\beta)|\beta|)^{1/2} = \Sigma (W(f_i)W^*(f_i))^{1/2} \tag{11}$$

where $W^*(f_i)$ and $W^*(f_i\beta)$ are complex conjugates of $W(f_i)$ and $W(f_i\beta)$ respectively and $(W^*(f_i)W(f_i))^{1/2}$ is an amplitude spectrum sample. For situations where the stretch factor $\beta$ or the wavelet varies with time, this true relative amplitude condition should be met on an instantaneous time basis.

In the most general form of this method, normal moveout stretched traces are transformed with a discrete Fourier transform and separated into overlapping frequency band traces with center frequencies $f_i$. The frequency bands should be complimentary so that the frequency domain sum of each of the frequency bands is equal to the frequency domain representation of the input trace data. Alternately, wavelet spectral estimates can be generated by frequency domain averaging of the Fourier transform samples of small time gates.

Using the above concepts, true relative amplitude destretching of seismic traces is done in 3 steps. First, wavelet spectral estimates are preferably corrected for non-white reflectivity spectra to produce a time varying reflectivity corrected stretched wavelet spectrum $W_s(f_i, t-t_{0j})$ given by the following expression:

$$W_s(f_i, t-t_{0j}) = W_n(f_i, t-t_{0j}) R(f_i)/R(f_i\beta) \tag{12}$$

where $W_n(f_i, t-t_{0j})$ is the stretched wavelet spectra at time $t-t_{0j}$ and frequency $f_i$, $R(f_i)$ is a non-white, vertical time reflectivity spectrum at frequency $f_i$ and $\beta$ is the stretch factor. Then the destretched (pre-NMO) target wavelet spectra $O(f_i)$ is defined using the similarity theorem as:

$$O(f_i) = W_s(f_i/\beta, t-t_{0j})/|\beta| \tag{13}$$

where $W_s(f_i, t-t_{0j})$ is the reflectivity corrected stretched wavelet spectra (the post-NMOR wavelet spectra) and $\beta$ the stretch factor.

Alternately, for true relative amplitude destretching (replacement of the post-NMOR wavelet) with a user specified target wavelet, $W_d(f_i)$, the desired output wavelet is defined as:

$$O(f_i) = W_d(f_i, t-t_{0j}) R(f_i) \tag{14}$$

where $R(f_i)$ is a user specified non-white, vertical time reflectivity spectrum at frequency $f_i$. Second, for each input amplitude value at center frequency $f_i$ and time $t-t_{0j}$, $A_{in}(f_i, t-t_{0j})$, the output amplitude, $A_{out}(f_i, t-t_{0j})$, is given by:

$$A_{out}(f_i, t-t_{0j}) = A_{in}(f_i, t-t_{0j}) O(f_i)/W_s(f_i, t-t_{0j}). \tag{15}$$

In general, the desired and estimated wavelet samples can be complex, having both amplitude and phase components.

Finally, at each time $t-t_{0j}$, the sum of the output frequency band data, $\Sigma A_{out}(f_i, t-t_{0j})$, is constrained so that the area under the spectra of the input and desired output wavelets are equal. For a desired output wavelet with minimum and maximum output frequencies $f_{min}$ and $f_{max}$, the stretched spectrum values are summed over $\beta^{-1} f_{min}$ to $\beta^{-1} f_{max}$ in $W_s(f_i, t-t_{0j})$ and over $f_{min}$ to $f_{max}$ in $O(f_i)$ and applied as follows:

$$A^{out}(t-t_{0j}) = \Sigma A_{out}(f_i, t-t_{0j}) \Sigma (W_s(f_i, t-t_{0j}) W_s^*(f_i, t-t_{0j}))^{1/2} / \Sigma (O(f_i) O(f_i))^{1/2} \tag{16}$$

to yield destretched true relative amplitude trace data, $A_{out}(t-t_{0j})$.

Figure 6:
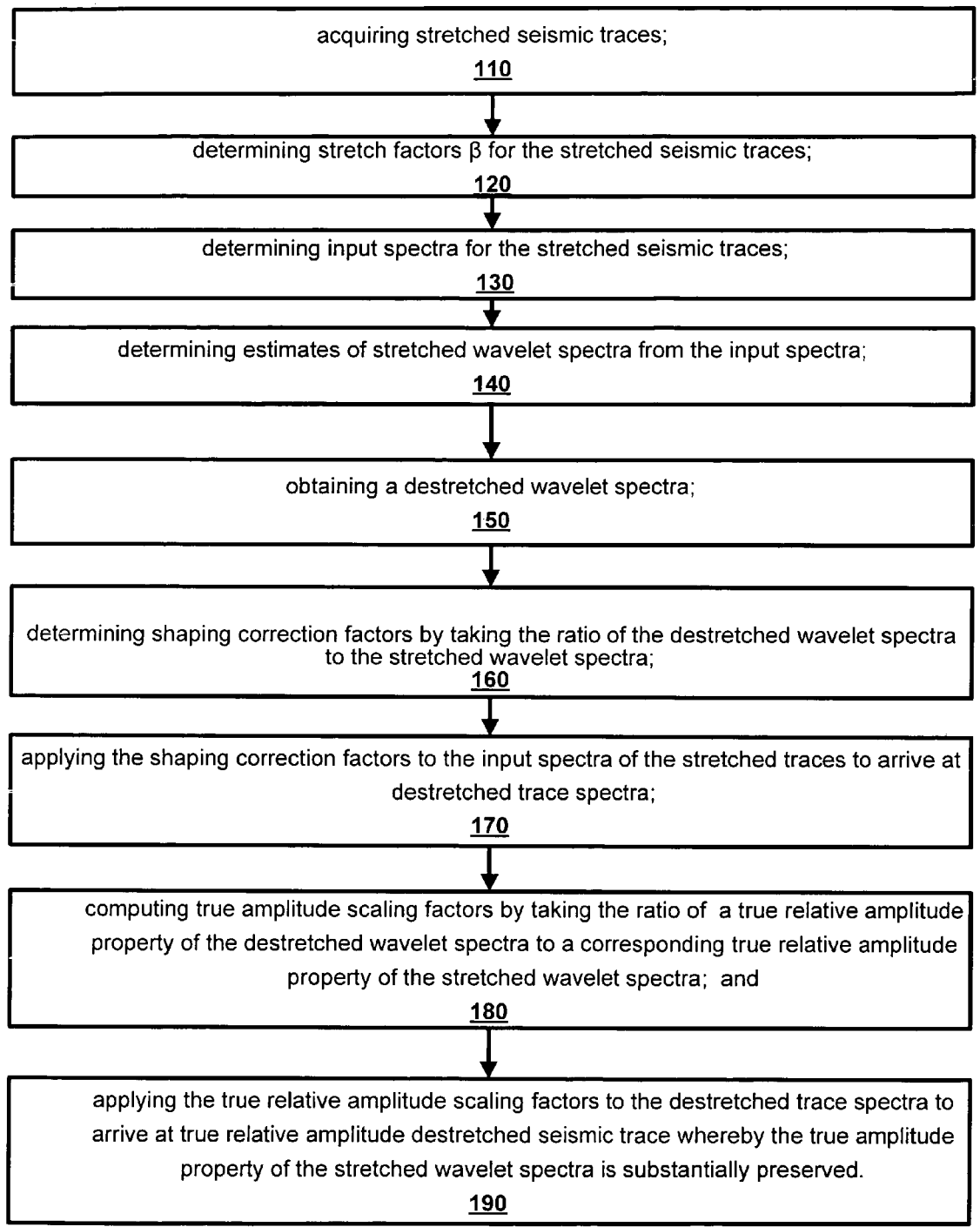
FIG. 6 is a flowchart depicting steps, taken in accordance with the present invention, for arriving at true relative amplitude destretched seismic traces from stretched seismic traces.

III. Detailed Steps for Implementing True Relative Amplitude Correction of Stretched Traces FIG. 6 shows a flowchart of preferred exemplary "destretch" method for arriving at true relative amplitude destretched seismic traces from stretched seismic traces. FIG. 7 expands upon the steps of FIG. 6 with each of the steps being identified with a corresponding brief descriptor at the top of the flowchart. Two examples of the destretch method are shown for processing (a) time-offset data in an upper flowpath and (b) time-angle data in a lower flowpath. Steps in each of these flowpaths are identified with the character "a" added to references numerals in the time-offset data flowpath and character "b" in time-angle data. In both exemplary flowpaths, the destretch processing of traces is accomplished by replacing wavelet spectra in stretched seismic traces with true relative amplitude pre-NMOR wavelet spectra to arrive at true relative amplitude destretched seismic traces.

FIG. 6 summarizes the general steps taken in the present destretch method. In step 110, stretched seismic traces are acquired. Stretch factors $\beta$ are then determined in step 120 for each of the stretched seismic traces. An input spectrum for each of the stretched traces is determined in step 130. Estimates of stretched wavelet spectra are made from the input spectra in step 140. In step 150, destretched wavelet spectra are obtained through calculations utilizing the stretch factor β of step 120 or else from a desired destretched wavelet spectra input by a user.

Shaping correction factors are determined in step 160 by comparing the destretched wavelet spectra to the stretched wavelet spectra. The shaping correction factors are applied in step 170 to the input spectra of the stretched traces to arrive at destretched trace spectra. True relative amplitude scaling factors are computed in step 180 by taking the ratio of a true relative amplitude property of the destretched wavelet spectra to a corresponding true relative amplitude property of the stretched wavelet spectra. Finally, the true relative amplitude scaling factors are applied in step 190 to the destretched trace spectra to arrive at true relative amplitude destretched seismic trace whereby the true relative amplitude property of the stretched wavelet spectra is substantially preserved.

Referring now to FIG. 7, the above destretch method may be carried out in a time-offset domain or in a time-reflection angle domain. The destretch method will first be described as applied to the time-offset domain.

A. Destretch Method—Time-Offset Domain

In step 110, stretched seismic traces are acquired. Input data is processed in such a way as to preserve true relative amplitude. Further the data is time corrected such that the now observed times in each trace represent the time as if the source and receiver positions were coincident, i.e. at zero-offset. This time correction can be done either through normal moveout removal or through Pre-Stack imaging processing. It is required that the distance from the source to receiver is known and constant over the length of a trace. This time correction process occurs on a trace by trace operation and any trace ordering can be used. However, the preferred data organization of traces is to sort ensembles of data into common depth point (CDP), common mid-point (CMP) or common reflection point (CRP) gathers. Additionally, it is assumed that an embedded waveform in the traces has a phase spectrum that is constant over the usable bandwidth (sufficiently strong amplitude) of the data. Auxiliary data required to calculate stretch factors β are a model of velocity as a function of location and time, and information detailing the location of a trace with respect to the velocity model and the distance from source to receiver distance or offset.

Stretch factors β are then determined in step 120A for each of the respective stretched seismic traces in step 120A. A stretch factor β is defined as the inverse of the cosine of the reflection angle $\theta_r$ for a trace.

FIG. 8 shows a shot source S and a receiver R. A wavelet of energy emanating from source S will general be refracted as it passes through subsurface formations. An interface containing a common reflection point (CRP) may be orientated at a geologic dip angle $\theta_d$ relative to a vertical normal. Straight ray reflection angle α is shown as the angle between the normal to the interface at the CRP and a ray extending from the CRP to receiver R. The reflection angle $\theta_r$ is the angle at which a wavelet will reflect from a CRP. As shown in FIG. 8, the wavelet will further refract after it is reflected from the CRP due to changing velocities in the subsurface, prior to be received at receiver R.

A deterministic estimate of the stretch factor β as a function of time and offset is generated from an rms velocity function and the subsurface interval velocity at the interface as:

$$\beta=(1-\sin^2\theta_r)^{-1/2}; \quad (17)$$

where $$\sin\theta_r=xv_i\cos\theta_d/(v_a^2(t_0^2+(x\cos\theta_d)^2/v_a^2)^{1/2}); \quad (18)$$

$$v_a=v_{rms}(1+2\epsilon\sin^2\alpha(2-\sin^2\alpha))^{1/2}; \text{ and} \quad (19)$$

$$\sin^2\alpha=x^2/(x^2+v_{rms}t_0)^2) \quad (20)$$

for CDP gathers:

$$\sin^2\theta_r=(xv_i\cos\theta_d)^2/(v_a^4(t_0^2+(x\cos\theta_d)^2/v_a^2)); \quad (18a)$$

for dip moveout (DMO) gathers:

$$\sin^2\theta_r=(x\cos\theta_d)^2/(t_{dmo}^2v_a^4/v_i^2)+(\cos^2\theta_d v_a^2/v_i^2)); \quad (18b)$$

and for PSTM data:

$$\sin^2\theta_r=(x\cos^2\theta_d)^2/((t_{mig}^2v_a^4/v_i^2)+(\cos^4\theta_d v_a^2/v_i^2)). \quad (18c)$$

wherein $\sin\theta_r$ is the sin of the reflection angle at the interface, x is shot to group offset, $v_i$ is the subsurface interval velocity at the $t_0$, $v_{rms}$ is the rms velocity of the overburden, $t_0$ is the zero offset travel time, $t_{dmo}$ is the zero offset travel time of DMO gathers, $t_{mig}$ is the zero offset time of migrated gathers, ε is the overburden anisotropy parameter and $\theta_d$ is the overburden anisotropy parameter and $\theta_d$ is the geologic dip at the interface.

The input trace spectra for the stretched traces is determined in step 130A where stretched traces are decomposed into a number of narrow frequency band traces, as shown in FIG. 4B. These narrow frequency band traces have the property that their sum will yield the original input trace.

Figure 9:
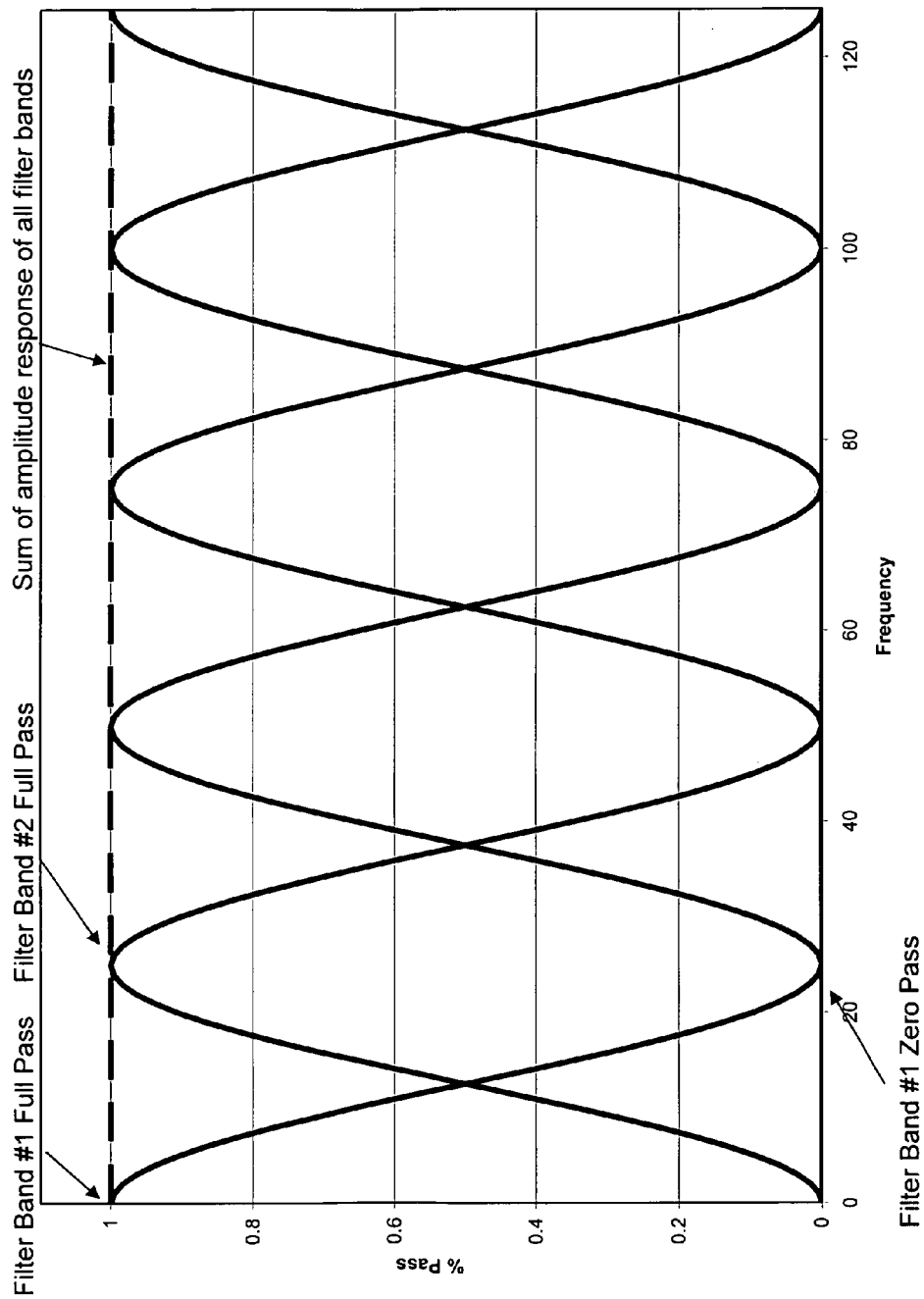
FIG. 9 illustrates the shape of individual filters used in the formation of complementary frequency band traces.

FIG. 9 shows the design of the frequency band filters required to generate the frequency band traces.

The number of frequency bands, $N_b$, is preferably chosen to be the smallest value that satisfies the following condition:

$$N_w \leq N_b \leq N_t/10 \quad (21)$$

where $N_w$ is the expected number of time samples in the wavelet and $N_t$ is the number of samples in the Fourier transform time window. Typical choices of $N_b$ and $N_t/10$ imply time averaging windows of several hundred milliseconds.

The preferred practice is to choose the number of frequency bands approximately equal to the number of sample points in the embedded waveform.

User defined frequency band filters have the property of fully passing data at a central frequency and tapering to fully rejecting data away from the central frequency. Neighboring frequency bands are entirely complimentary such that the full pass central frequency is the zero pass frequency of adjacent frequency bands. Corresponding frequency samples of each frequency filter is multiplied by the Fourier transform of the input trace. The result of this operation forms the filtered Fourier transformed frequency data. This product is then inverse Fourier transformed to yield the desired narrow frequency band traces of FIG. 4B.

Estimates of stretched wavelet spectra are made in step 140A from the input spectra of step 130A.

FIGS. 4A-D illustrates the decomposition of the single event of FIG. 4A into frequency bands using an $N_b$ value that satisfy the above constraints. The frequency bands are then inverse transformed back to the time traces shown in FIG. 4B. Envelopes or rms time averaging of each of these time traces is used to generate the time and frequency independent post-NMOR wavelet spectral estimates $W_n(f_i,t-t_{0j})$, for each center frequency $f_i$ and time $t-t_{0j}$. according to Equation (8):

$$W_n(f_i,t-t_{0j})=(r_c)W(f_i\beta,t-t_{0j})|\beta| \tag{22}$$

where $\beta$ is the stretch factor and $r_c$ is a local reflectivity scalar.

An estimate of the amplitude of each frequency band trace is computed by taking the filtered Fourier transformed frequency data that is an intermediate product from step 130A and applying a 90° phase rotation and then computing the inverse Fourier transform which forms a Hilbert transform for each corresponding frequency band trace from step 130A. To form the trace envelope corresponding time samples from each narrow frequency band trace, Hilbert transform pairs are squared, summed together and the square root is taken of the resulting sum. This forms the trace envelope (FIG. 4C) which is filtered to reduce the effects of noise. The resulting collection of trace amplitudes represents an estimate of the pre-corrected wavelet amplitude spectrum determined on a time by time basis.

A destretched output spectrum is obtained in step 150A. In a preferred manner, the estimates of the stretched wavelet spectra determined in step 140A are corrected utilizing the Similarity Theorem Equation (5). This correction utilizes the stretch factors ($\beta$) Equation (17-20) calculated in step 120A and the estimate of the stretched wavelet spectra of Equation (8) determined in step 140A to correct for the stretch in the trace data. For each time and mean frequency in step 140A, the amplitude of stretched wavelet is interpolated at a frequency that is the product of $\beta$ and the current central frequency. The interpolated amplitude is, in turn, multiplied by the inverse stretch factor ($\beta^{-1}$) and becomes a corrected sample of the destretched output spectrum. The product of performing this operation is to form a time varying corrected wavelet amplitude spectrum.

As an alternative to calculating the destretched output spectrum, a user defined target waveform may be used to generate the destretched output spectrum. This destretched output spectrum preferably has the characteristic of having high and low frequency characteristics that extend across the usable data frequencies on the widest offset traces.

Shaping (or corrected shaping) correction factors are determined in step 162A using Equations (12-14) by taking the ratio of the destretched wavelet spectra to the stretched wavelet spectra. A stabilization factor is preferably added to the denominator (stretched wavelet spectra) to prevent possible division by zero. If warranted, an optional correction to the destretched wavelet spectrum for non-white reflectivity is computed in step 160A using Equations (12) and (14). This correction is performed by modeling the amplitude spectrum of the underlying earth reflectivity. The modeled earth reflectivity spectrum is divided into the destretched wavelet spectrum determined in step 150A.

The shaping (or corrected shaping) correction factors are applied in step 170A to the input spectra of the stretched traces using Equation (15) to arrive at a destretched trace spectra.

True relative amplitude scaling factors are computed in step 180A. The ratios of corresponding true relative amplitude properties of the stretched and destretched wavelet spectra are taken to determine the true relative amplitude scaling factors. Examples of such true relative amplitude properties include the zero time value of a wavelet, the area under the amplitude spectrum of the wavelet, or the time average mean absolute value of the stretched traces.

The true relative amplitude scaling factors and shaping (or corrected shaping) factors are applied in step 192A to the destretched trace spectra using Equation (16) to arrive at true relative amplitude destretched seismic traces whereby the true relative amplitude property of the stretched wavelet spectra is substantially preserved. The input spectra of step 130A are corrected in step 192A to form a corrected output spectrum comprising individual frequency band traces. Corresponding samples in time and central frequency from the output of step 180A, i.e., the correction factors, and from step 162A, i.e., the shaping (or corrected shaping) factors, are multiplied by those of step 130A the input data represented as frequency forming corrected frequency bands. The corrected output spectrum is converted into destretched seismic traces in step 195A. The corrected individual frequency band traces of step 190A are summed together to form the destretched output traces.

Finally, at each time $t-t_{0j}$, the sum of the output frequency band data, $\Sigma A_{out}(f_i,t-t_{0j})$, is constrained so that the area under the spectra of the input and desired output wavelets are equal. For a desired output wavelet with minimum and maximum output frequencies $f_{min}$ and $f_{max}$, the stretched spectrum values are summed over $\beta^{-1}f_{min}$ to $\beta^{-1}f_{max}$ in $W_s(f_i,t-t_{0j})$ and over $f_{min}$ to $f_{max}$ in $O(f_i)$ and applied as follows:

$$A^{out}(t-t_{0j})=\Sigma A_{out}(f_i,t-t_{0j})\Sigma(W_s(f_i,t-t_{0j})W_s^*(f_i,t-t_{0j}))^{1/2}/\Sigma(O(f_i)O^*(f_i))^{1/2} \tag{16}$$

to yield destretched true relative amplitude trace data, $A_{out}(t-t_{0j})$.

B. Destretch Method Time-Angle Domain

In step 110, stretched seismic traces are acquired. As described above, the stretched traces may have been processed by normal move out removal (NMOR) or through the Pre-Stack imaging process.

Stretch factors $\beta$ are then determined in step 120B for the stretched seismic traces. The stretch factor $\beta$ is defined as the inverse of the cosine of the reflection angle $\theta_r$. Since this reflection angle $\theta_r$ is a constant value over a trace, the reflection angle $\theta_r$ can be determined directly by interrogating the trace header for each trace.

Input spectra for stretched trace windows are determined in step 130B. The data is split into overlapping windows. Each window, in turn, is converted to the frequency domain by taking its Fourier transform in step 132B and calculating its amplitude spectrum.

An estimate of the stretched wavelet (amplitude) spectrum is calculated in step 140B. These estimates are determined by smoothing the input spectra from step 132B by low pass filtering thus forming the estimate of the stretched wavelet spectrum.

A destretched wavelet spectrum is obtained in step 150B. Preferably, the destretched wavelet spectrum is calculated as follows. The estimate of the stretched wavelet spectrum determined in step 140B is now corrected utilizing the Similarity Theorem. This correction uses the stretch factor ($\beta$) determined in step 120B and the estimate of the stretched wavelet spectrum to correct for the stretch in the data. The amplitude for each frequency sample in step 140B is interpolated at a frequency that is the product of $\beta$ and the current frequency. The amplitude for that frequency sample is, in turn, scaled by the stretch factor $\beta$ and becomes the destretched wavelet (amplitude) spectrum.

As an alternative to calculating the destretched output spectrum, a user defined target waveform may be used to generate the destretched output spectrum. This destretched output spectrum preferably has the characteristic of having high and low frequency characteristics that extend across the usable data frequencies on the widest offset traces.

If warranted, an additional adjustment is made to the shaping correction factors in step 160B to accommodate for non-white reflectivity. This correction is calculated by modeling the amplitude spectrum of the underlying earth reflectivity. The modeled earth reflectivity spectrum is divided into the destretched wavelet spectrum determined in step 150B.

Shaping correction factors (or corrected shaping factors) are determined in step 162B by comparing the estimates of the stretched wavelet spectrum with the desired destretched wavelet spectrum. The quotient or ratio of each corresponding frequency sample of the destretched wavelet spectra to the stretched wavelet spectra is calculated to arrive at the shaping correction factors. Preferably, a stabilization factor is added to the denominator to prevent division by zero.

The shaping correction factors (or the adjusted shaping factors) are applied in step 170B to the input spectra of the stretched traces to arrive at a destretched trace spectra.

True relative amplitude scaling factors are then computed in step 180B. Ratios of corresponding true relative amplitude properties of the stretched and destretched wavelet spectra are calculated to determine the true relative amplitude scaling factors. Again, these true relative amplitude properties might include zero time value of a wavelet, the area under the amplitude spectrum of the wavelet, or the time average mean absolute value of the stretched traces.

The true relative amplitude scaling factors and shaping correction factors (or corrected shaping correction factors) are applied in step 190B to the destretched trace spectra to arrive at true relative amplitude destretched seismic trace whereby the true relative amplitude property of the stretched wavelet spectra is substantially preserved. More particularly, corresponding frequency samples of the shaping correction factors (or corrected shaping correction factors) and the true relative amplitude scaling factors are applied to the input spectra of the stretched trace windows to arrive at an output spectra of destretched trace windows. In step 192B the destretched time windows of the data are formed by taking the inverse Fourier transform of the product of step 190B. The destretched seismic traces are formed in step 194B by summing the individual windows to reconstitute the traces.

Figures 5A, 5B:
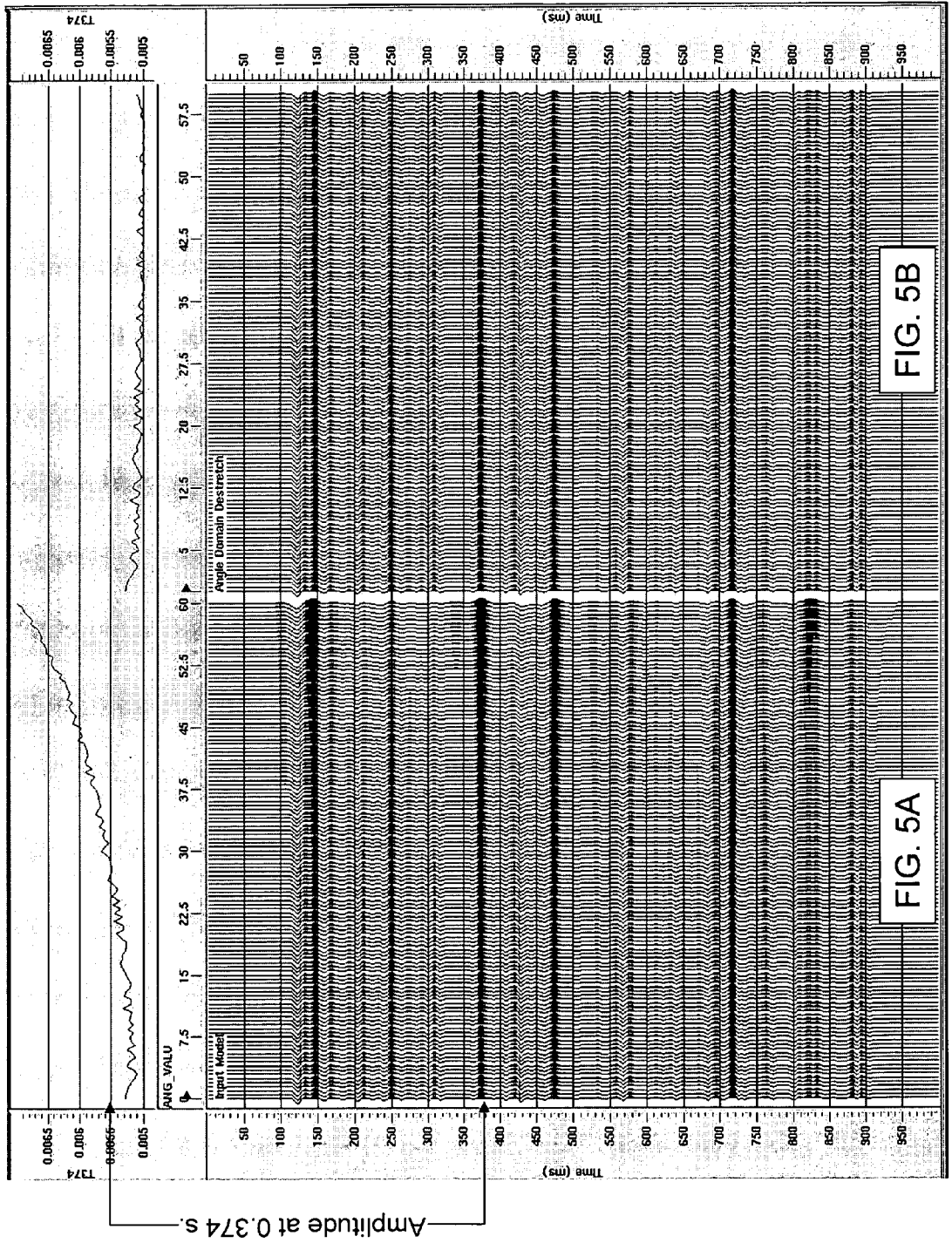
FIGS. 5A-B illustrate an example of destretching applied to a common angle CMP gather containing normal moveout stretch effects comparing a stretched gather to a destretched gather for a multi-event model.

FIG. 5 is an example of destretching a common angle CMP gather. The stretched input gathers on the left have interference induced apparent residual moveout as well as angle dependent variations in amplitude irrespective of the fact that each event's reflection coefficients are equal with angle. In the destretched data on the right, all events have nearly identical amplitudes with angle as well as reduced apparent residual moveout.

The inventor also includes a program storage device readable by a machine, tangibly embodying a program of instructions executable by the machine to perform method steps for arriving at true relative amplitude destretched seismic traces from stretched seismic traces using the following steps:

a. acquiring stretched seismic traces;
b. determining stretch factors $\beta$ for the stretched seismic traces;
c. determining input spectra for the stretched seismic traces;
d. determining estimates of stretched wavelet spectra from the input spectra;
e. obtaining a destretched wavelet spectra;
f. determining shaping correction factors by taking the ratio of the destretched wavelet spectra to the stretched wavelet spectra;
g. applying the shaping correction factors to the input spectra of the stretched traces to arrive at a destretched trace spectra;
h. computing true relative amplitude scaling factors by taking the ratio of a true relative amplitude property of the destretched wavelet spectra to a corresponding true relative amplitude property of the stretched wavelet spectra; and
i. applying the true relative amplitude scaling factors to the destretched trace spectra to arrive at true relative amplitude destretched seismic trace whereby the true relative amplitude property of the stretched wavelet spectra is substantially preserved.

While in the foregoing specification this invention has been described in relation to certain preferred embodiments thereof, and many details have been set forth for purposes of illustration, it will be apparent to those skilled in the art that the invention is susceptible to alteration and that certain other details described herein can vary considerably without departing from the basic principles of the invention.

What is claimed is:

1. A method for arriving at true relative amplitude destretched seismic traces from stretched seismic traces, the method comprising the steps of:
    a. acquiring stretched seismic traces;
    b. determining stretch factors $\beta$ for the stretched seismic traces;
    c. determining input spectra for the stretched seismic traces;
    d. determining estimates of stretched wavelet spectra from the input spectra;
    e. obtaining a destretched wavelet spectra;
    f. determining shaping correction factors by taking the ratio of the destretched wavelet spectra to the stretched wavelet spectra;
    g. applying the shaping correction factors to the input spectra of the stretched traces to arrive at a destretched trace spectra;
    h. computing true relative amplitude scaling factors by taking the ratio of a true relative amplitude property of the destretched wavelet spectra to a corresponding true relative amplitude property of the stretched wavelet spectra; and
    i. applying the true relative amplitude scaling factors to the destretched trace spectra to arrive at true relative amplitude destretched seismic trace whereby the true relative amplitude property of the stretched wavelet spectra is substantially preserved.

2. The method of claim 1 wherein:
    the destretched wavelet spectra is obtained by mapping the stretched wavelet spectra utilizing the similarity theorem with the stretch factor $\beta$ into a destretched wavelet spectra utilizing the following mathematical formulas:

$$W(f) = W_n(f\beta)/|\beta|;$$

where:
   W(f)=destretched wavelet spectra;
   $W_n(f)$=the stretched wavelet spectra; and
   $\beta$=the wavelet stretch factor.

3. The method of claim 2 wherein the stretched wavelet spectra are modified to correct for a non-white reflectivity utilizing the following mathematical formula:

$W_s(f)=W_n(f)R(f)/R(f\beta)$;

where:
- $W_s(f)$=the stretched wavelet spectra corrected for a non-white reflectivity spectrum;
- $W_n(f)$=the stretched wavelet spectra;
- $R(f)$=a user specified reflectivity spectrum in normal incidence time; and
- $\beta$=the wavelet stretch factor.

4. The method of claim 1 wherein:
the destretched wavelet spectra is obtained from a user specified target wavelet spectra;

$W(f)=W_d(f)$;

where:
- $W(f)$=destretched wavelet spectra; and
- $W_d(f)$=a user specified target wavelet spectra.

5. The method of claim 4 wherein the target wavelet spectra are modified to correct for a non-white reflectivity utilizing the following mathematical formula:

$W(f)=W_d(f)R(f)$;

where:
- $W(f)$=destretched wavelet spectra;
- $W_d(f)$=a user specified target wavelet spectra; and
- $R(f)$=a user specified reflectivity spectrum in vertical time.

6. The method of claim 1 wherein:
the stretch factors $\beta$ are calculated deterministically as functions of offset, time, rms velocity, and interval velocity.

7. The method of claim 1 wherein:
the stretch factors $\beta$ are calculated deterministically as functions of offset, time, rms velocity, interval velocity, and at least one of overburden anisotropy and geologic dip.

8. The method of claim 7 wherein:
the stretched seismic traces are CDP gathers and $\beta$ is calculated in accordance with the following mathematical expression:

$\beta=(1-\sin^2\theta_r)^{-1/2}=1/\cos\theta_r$;

where:
- $\sin^2\theta_r=(xv_i\cos\theta_d)^2/(v_a^4(t_0^2+(x\cos\theta_d)^2/v_a^2))$;
- $v_a=v_{rms}(1+2\epsilon\sin^2\alpha)^{1/2}$;
- $\sin^2\alpha=x^2/(x^2+v_{rms}t_0)^2)$; and where:
- $\theta_r$ is the reflection angle at the interface;
- x is shot to group offset;
- $v_i$ is the subsurface interval velocity at the $t_0$;
- $v_{rms}$ is the rms velocity of overburden;
- $t_0$ is the zero offset travel time;
- $\epsilon$ is the overburden anisotropy parameter; and
- $\theta_d$ is the geologic dip at the interface.

9. The method of claim 7 wherein:
the stretched seismic traces are dip moveout (DMO) gathers and $\beta$ is calculated in accordance with the following mathematical expression:

$\beta=(1-\sin^2\theta_r)^{-1/2}$;

where:
- $\sin^2\theta_r=(x\cos\theta_d)^2/((t_{dmo}^2v_a^4/v_i^2)+(\cos^2\theta_d v_a^2/v_i^2))$;
- $v_a=v_{rms}(1+2\epsilon\sin^2\alpha(2-\sin^2\alpha))^{1/2}$;
- $\sin^2\alpha=x^2/(x^2+v_{rms}t_0)^2)$; and where:
- $\theta_r$ is the reflection angle at the interface;
- x is shot to group offset,
- $v_i$ is the subsurface interval velocity at the $t_0$;
- $v_{rms}$ is the rms velocity of overburden;
- $t_{dmo}$ is the zero offset travel time of DMO gathers;
- $\epsilon$ is the overburden anisotropy parameter; and
- $\theta_d$ is the geologic dip at the interface.

10. The method of claim 7 wherein:
the stretched seismic traces are CRP gathers and $\beta$ is calculated in accordance with the following mathematical expression:

$\beta=(1-\sin^2\theta_r)^{-1/2}$;

where:
- $\sin^2\theta_r=(x\cos^2\theta_d)^2/((t_{mig}^2v_a^4/v_i^2)+(\cos^4\theta_d v_a^2/v_i^2))$
- $v_a=v_{rms}(1+2\epsilon\sin^2\alpha(2-\sin^2\alpha))^{1/2}$;
- $\sin^2\alpha=x^2/(x^2+v_{rms}t_0)^2)$; and where:
- $\theta$ is the reflection angle at the interface;
- x is shot to group offset,
- $v_i$ is the subsurface interval velocity at the $t_0$;
- $v_{rms}$ is the rms velocity of overburden;
- $t_{mig}$ is the zero offset time of migrated gathers;
- $\epsilon$ is the overburden anisotropy parameter; and
- $\theta_d$ is the geologic dip at the interface.

11. The method of claim 1 wherein:
the true relative amplitude property, that is preserved in the true relative amplitude destretched traces, is selected from one of the following; zero time value of the wavelet, the area under the amplitude spectrum of the wavelet, and time average mean absolute value of the stretched traces.

12. A program storage device readable by a machine, tangibly embodying a program of instructions executable by the machine to perform method steps for arriving at true relative amplitude destretched seismic traces from stretched seismic traces, the method comprising the steps of:

a acquiring stretched seismic traces;
b determining stretch factors $\beta$ for the stretched seismic traces;
c. determining input spectra for the stretched seismic traces;
d. determining estimates of stretched wavelet spectra from the input spectra;
e. obtaining a destretched wavelet spectra;
f. determining shaping correction factors by taking the ratio of the destretched wavelet spectra to the stretched wavelet spectra;
g. applying the shaping correction factors to the input spectra of the stretched traces to arrive at a destretched trace spectra;
h. computing true relative amplitude scaling factors by taking the ratio of a true relative amplitude property of the destretched wavelet spectra to a corresponding true relative amplitude property of the stretched wavelet spectra; and
i. applying the true relative amplitude scaling factors to the destretched trace spectra to arrive at true relative amplitude destretched seismic trace whereby the true relative amplitude property of the stretched wavelet spectra is substantially preserved.

* * * * *